(12) United States Patent
Lefkowitz (10) Patent No.: US 9,204,250 B2
(45) Date of Patent: Dec. 1, 2015

(54) PERSONALLY ATTENDED SERVICE NOTIFICATION BASED ON TEMPORAL AND SPATIAL PROXIMITY

(71) Applicant: Howard Lefkowitz, Henderson, NV (US)

(72) Inventor: Howard Lefkowitz, Henderson, NV (US)

( * ) Notice: Subject to any disclaimer, the term of this patent is extended or adjusted under 35 U.S.C. 154(b) by 0 days.

(21) Appl. No.: 14/184,410

(22) Filed: Feb. 19, 2014

(65) Prior Publication Data

US 2014/0235276 A1 Aug. 21, 2014

Related U.S. Application Data

(60) Provisional application No. 61/767,080, filed on Feb. 20, 2013.

(51) Int. Cl.
*H04W 4/02* (2009.01)
*G06Q 50/00* (2012.01)

(52) U.S. Cl.
CPC *H04W 4/02* (2013.01); *G06Q 50/01* (2013.01)

(58) Field of Classification Search
CPC ............................... H04W 4/02; G06Q 50/01
USPC ................... 455/456.1–456.6, 414.1
See application file for complete search history.

(56) References Cited

U.S. PATENT DOCUMENTS

| | | | |
|---|---|---|---|
| 8,019,282 B2 * | 9/2011 | Blight et al. | 455/41.2 |
| 8,032,622 B2 * | 10/2011 | Caspi et al. | 709/223 |
| 8,090,707 B1 * | 1/2012 | Orttung et al. | 707/710 |
| 2006/0047825 A1 * | 3/2006 | Steenstra et al. | 709/229 |
| 2008/0235349 A1 | 9/2008 | Caspi et al. | |
| 2010/0144272 A1 | 6/2010 | Blight et al. | |
| 2011/0054978 A1 * | 3/2011 | Mohil | 705/9 |
| 2011/0137929 A1 * | 6/2011 | Lehmann et al. | 707/769 |
| 2011/0212711 A1 * | 9/2011 | Scott | 455/414.2 |

(Continued)

FOREIGN PATENT DOCUMENTS

| | | | | |
|---|---|---|---|---|
| WO | WO 2011/119859 A2 | 9/2011 | | |
| WO | WO 2012/167087 A1 * | 12/2012 | ............ | G06Q 50/10 |
| WO | WO 2012/167087 A2 | 12/2012 | | |

OTHER PUBLICATIONS

International Search Report and Written Opinion for PCT/US2014/017275 filed Feb. 20, 2014, and mailed from the International Searching Authority on Jun. 3, 2014, 11 pgs.

(Continued)

*Primary Examiner* — Brandon Miller
(74) *Attorney, Agent, or Firm* — John R. Thompson; Stoel Rives LLP (57) ABSTRACT

A computer system may notify a user about personally attended services satisfying temporal-spatial criteria. The computer system may use a user location and/or information on already scheduled events to determine whether a personally attended service satisfies the temporal-spatial criteria. Travel time may be determined and included when determining whether the personally attended service conflicts with an already scheduled event. The temporal-spatial criteria may also include availability of the personally attended service. A user profile and/or third party information may be used to determine if a user is available and/or would be receptive to a personally attended service. The user profile may be generated from third party information, such as contained in an online social network, and/or learned. The user may be able to reserve the personally attended service through the computer system.

24 Claims, 5 Drawing Sheets

(56) References Cited

U.S. PATENT DOCUMENTS

| | | |
|---|---|---|
| 2011/0238755 A1* 9/2011 | Khan et al. | 709/204 |
| 2011/0252097 A1* 10/2011 | Walker et al. | 709/206 |
| 2013/0332219 A1* 12/2013 | Clark et al. | 705/7.19 |
| 2015/0095086 A1* 4/2015 | Gopinath et al. | 705/7.18 |
| 2015/0201064 A1* 7/2015 | Bells et al. | H04M 1/72566 |

OTHER PUBLICATIONS

International Preliminary Report on Patentability for Serial No. PCT/US2014/017275 filed Feb. 20, 2014, and mailed from the International Bureau on Sep. 3, 2015, 8 pgs.

* cited by examiner

PERSONALLY ATTENDED SERVICE NOTIFICATION BASED ON TEMPORAL AND SPATIAL PROXIMITY

RELATED APPLICATIONS

This application claims priority to U.S. Provisional Patent Application Ser. No. 61/767,080 filed Feb. 20, 2013 and entitled "Personally Attended Service Notification Based on Temporal and Spatial Proximity," which is hereby incorporated by reference herein in its entirety.

TECHNICAL FIELD

This disclosure relates to systems and methods for notifying a user of temporally and spatially proximate personally attended services.

DETAILED DESCRIPTION OF PREFERRED EMBODIMENTS

A city may offer numerous personally attended services, such as entertainment services (e.g., shows, tours, amusement parks, historical sites, etc.), hospitality services (e.g., restaurants, bars, night life, etc.), transportation services (e.g., taxis, public transportation, etc.), beauty services (e.g., haircuts, spa treatments, etc.) and the like, that may be attended by a person and/or their designee. The person may have difficulty identifying personally attended services that are available, nearby, and/or compatible with the person's schedule. The person may be unaware of the services and/or considerable time and/or effort may be required to determine availability and/or timing of the personally attended services.

A computer system may aid a user in identifying temporally proximate and/or spatially proximate personally attended services using temporal-spatial criteria. The temporal-spatial criteria may include temporal criteria, spatial criteria, and/or a combined temporal and spatial criteria. The computer system may determine a user location that can be used to identify spatially proximate personally attended services. The user location may be computed from satellite navigation signals (e.g., Global Positioning System (GPS) signals), cellular tower locations, wireless network access points, internet protocol (IP) addresses, etc.; received from the user, a navigation system, and/or another computer system; and/or the like. Computer systems able to determine a location may include a smart phone, a tablet (e.g., an iPad®, a Kindle®, or the like), a laptop computer, a smart TV, a desktop computer, and/or the like. For each personally attended service, the computer system may determine and/or receive a service location. Spatial proximity may be determined by identifying personally attended services within a predetermined distance of the user location. The predetermined distance may be an absolute distance; the boundary of a city or municipality; a predetermined metropolitan area of a city or municipality, which may be proprietary or nonproprietary; a combination of absolute distance, political divisions, and/or predetermined metropolitan area; and/or the like. Alternatively, or in addition, the spatial distances may be converted into travel times, and spatial proximity may be analyzed simultaneously with temporal proximity as discussed below.

The computer system may determine a best method of transportation and/or allow the user to indicate the desired method of transportation when determining travel time. For example, the computer system may recommend a method of transportation but allow the user to select a different method. A travel time may be determined based on the method of transportation. The computer system may add in buffer time to ensure arrival before the personally attended service and/or to allow for time spent waiting for transportation and/or transferring between modes of transportation (e.g., waiting for a taxi or a train). The buffer time may be a fixed amount, a percentage of the total travel time, based on the modes of transportation used in computing the travel time, user entered, a combination of the aforementioned, and/or the like. If actual travel time is varying from predicted travel time and/or the predicted travel time indicates the user will be late (e.g., traffic data and/or a map routing algorithm indicates a predicted time of arrival later than the start time of a personally attended service), the computer system may attempt to move reservations and/or take actions to mitigate the effect of the late arrival.

Temporal proximity may be determined by identifying personally attended services that do not conflict with an already scheduled event. The already scheduled event may be before and/or after the personally attended service. Travel time to and/or from the personally attended service may be included when determining whether a conflict exists. Additional buffer time may be added for some personally attended services to ensure any pre-service requirements may be satisfied by the user (e.g., picking up tickets, filling out waivers, etc.). The additional buffer time may be predetermined, and/or the computer system may receive an indication of the additional buffer time from a computer system associated with the personally attended service. The travel time, including any additional buffer time, may be included when comparing the end time of an already scheduled event before the personally attended service with the start time of a personally attended service and/or the start time of an already scheduled event after the personally attended service with the end time of the personally attended service. Alternatively, or in addition, determining temporal proximity may include determining if a start time for a personally attended service is too far in the future and/or if the travel time exceeds a predetermined threshold. Travel time may also or instead be analyzed when determining spatial proximity.

A user may be able to create a profile and set rules and/or preferences used to determine spatial and/or temporal proximity. For example, the user may specify an absolute distance, time until start, and/or travel time that should not be exceeded. The user may set exclusion areas and/or boundaries limiting the locations of personally attended services offered to the user. The user may set buffer times, preferred methods of transportation (e.g., an always preferred method and/or preferred methods for different situations and/or distances), and/ or rules for computing travel time from a given method of transportation (e.g., a walking speed). The spatial and/or temporal proximity rules, preferences, and/or thresholds may be universal and/or default for all personally attended services, and/or the user may specify rules, preferences, and/or thresholds based on the category of service, the type of service, and/or the particular services. For example, the user may have default rules for hospitality services, an overriding set of default rules for restaurants, and a specific rule for the user's favorite restaurant (e.g., start times for hospitality services should be no more than 30 minutes in the future, but restaurants can have wait times of up to 45 minutes, and the user's favorite restaurant can have a wait time of up to 1 hour).

The temporal-spatial criteria may also or instead include criteria based on the user profile that can be used to determine which personally attended services should be offered to a user. Different users may enjoy different activities, such as a first user that enjoys going to the highest rated restaurants, a second user that likes seeing all the newest shows and/or movies, and a third user that enjoys exploring nightlife hot spots. The user may specify categories, types, and/or particular services should or should not be offered to the user. The user may be able to set desired ranges for prices and/or ratings for categories, types, and/or particular services (e.g., a particular service may be excepted from a price and/or ratings rule otherwise applicable). Services may be ranked according to the user profile, user-determined criteria, and/or third party rankings. If the user profile/criteria, third party rankings, and/or data about the service are unavailable, the computer system may provide an unranked list.

In some embodiments, the user profile may be derived from secondary information (e.g., work and home addresses, income, etc.) and/or a third party (e.g., a social network profile and/or user activity within the social network, such as preference indications in the social network and/or interaction with a profile or page associated with a personally attended service). The user profile may be learned. The user profile may be created and/or modified based on past user behavior, such as personally attended services accepted and/or rejected by the user, ratings of previously attended services (e.g., ratings through third parties and/or ratings requested by the computer system when the personally attended service ends), and/or the like. The user may be able to specify a wish list, such as a show/movie the user would like to see and/or a restaurant the user wants to eat at. The computer system may monitor start times, waits, availability, special discounts, the user's schedule, and/or the like to recommend optimal times to attend the service.

The computer system may determine whether the user is available to attend a personally attended service before identifying and/or offering one or more personally attended services. In an embodiment and/or configuration, the computer system may detect that a previous personally attended service has ended and/or is about to end and, in response, identify one or more personally attended services the user may attend next (e.g., identifying a restaurant after a show or tour ends if the time is within a predetermined and/or user defined range). The computer system may interrupt personally attended services and/or alert the user to a personally attended service despite no availability based on, for example, user preferences (e.g., the user must leave to catch the last train and/or a personally attended service very desirable to the user has become available). In some embodiments, the computer system may determine whether the user's calendar and/or schedule has an opening at any time during which the one or more personally attended services may be attended. The computer system may notify the user immediately upon determining that a new personally attended service is available and/or that the user requires a personally attended service. Alternatively, or in addition, a digest may be sent to the user of any new personally attended services and/or any personally attended services newly determined to be required.

Determining user availability may include the computer system receiving information, such as from third parties, a server, applications, and/or the like, that can be used to determine whether a condition exists that would be receptive to a condition-related personally attended service. For example, the computer system may obtain and/or receive weather information when determining a method of transportation. In some embodiments, the computer system may determine when a first personally attended service will end, and, for example, may automatically schedule a condition-related personally attended service with a corresponding start time, such as requesting that a taxi arrive when dinner or a show ends if it is raining. In another example, the computer system may receive updates on new shows and/or movies that have recently opened. The computer system may determine whether the new show or movie is of interest to the user based on the user profile (e.g., whether the genre is of interest to the user). If the computer system determines the show or movie may be of interest, it may prompt the user to confirm interest, add the show or movie to the user's wish list, and/or attempt to schedule the show or movie. The computer system may track or store information that can be used to determine whether a condition-related personally attended service should be offered. For example, the computer system may track the time since the user last attended a favorite restaurant and/or the time since the user's last haircut, and the computer system may prompt the user and/or attempt to schedule the event if sufficient time has passed for the user to require and/or prefer the service again.

The computer system may determine if the personally attended services have availability for the user to attend them (e.g., remaining tickets and/or openings). The user profile may specify the amount of availability required. For example, a user may wish to attend events with a significant other and may require two tickets to be available, and/or the user may prefer to attend personally attended services that are not crowded and may require more availability than the number of tickets the user intends to purchase. The temporal-spatial criteria may include criteria based on availability.

The computer system may present identified personally attended services to the user that satisfy the temporal-spatial criteria, which may include availability. The computer system may provide a list, one or more audio indications, and/or one or more visual indications of personally attended services satisfying the temporal-spatial criteria. Various audio and/or visual indications may be used in different embodiments. The computer system may also provide details about the personally attended services to the user and/or directions to the personally attended service. As time passes while the user is deciding which personally attended service to attend, one or more personally attended services may no longer satisfy the temporal-spatial criteria and/or new personally attended services may begin to satisfy the temporal-spatial criteria. The presented personally attended services may be dynamically updated as time progresses. Visual indications, such as specific colors and/or flashing, may indicate that a personally attended service is newly added, about to expire, and/or expired. The computer system may stop presenting a personally attended service to the user when it is no longer valid (e.g., the personally attended service no longer has any availability and/or the user cannot arrive before the start time).

The user may be able to select an indicated personally attended service of interest and make a reservation with the personally attended service through the computer system. A service computer system associated with the personally attended service may update the inventory in real time based on the reservation received from the computer system. Accordingly, the service computer system may be able to provide real-time inventory management, and a real-time inventory may be provided to the computer system to inform the user of availability.

Additionally, discounts on the personally attended service may be indicated to the user. For example, the personally attended service may have an abundance of availability that needs to be sold. The service computer system may notify the computer system, which in turn may notify the user of a discount. Personally attended services may be discounted after their start time (e.g., tickets to a football game may be discounted after kickoff). The user profile may specify whether the user is interested in receiving offers for discounted personally attended services and may include a maximum price or minimum discount percentage for any offers and/or whether the user is willing to attend personally attended services after their start time. The user may be able to specify different rules and/or criteria for offering discounts based on the type of service.

Some embodiments may include features helpful to tourists and/or visitors to a city and/or destination. The computer system may recommend popular and/or famous personally attended services. The computer system may present a plurality of personally attended services, and the user may rank and/or indicate "must see" personally attended services. The computer system may arrange a schedule. For example, the computer system may attempt to maximize a weighting function that weights the personally attended services based on rank in addition to, or instead of, the temporal-spatial criteria.

The computer system may include information about local transportation. The computer system may provide specific information and/or recommendations about transportation, such as where to pick up public transportation, which stop to use, and/or when public transportation stops running. The computer system may use the user location to alert the user when their stop is next, so the user can alert the driver and/or prepare to exit without having to worry about missing their stop. The computer system may be aware of walking routes that are popular and/or that pass by famous, historical, and/or popular attractions. The user may be able to indicate and/or update the user profile with methods of transportation available or preferred (e.g., the user does not have a car, the user prefers not to ride the bus, the user does not like to walk over an indicated distance and/or at all, etc.). The user may be able to indicate that the transportation preferences are temporary, permanent, and/or should be used only with a particular location. The user may be prompted to use the transportation preferences for the particular location when it is determined that the user location is near the particular location, and/or the transportation preferences may be loaded automatically.

The computer system may include a processor. Embodiments may include various steps, which may be embodied in machine-executable instructions to be executed by the computer system. The computer system comprises one or more general-purpose or special-purpose computers (or other electronic devices). Alternatively, the computer system may comprise hardware components that include specific logic for performing the steps or comprise a combination of hardware, software, and/or firmware. Without limitation, a computer system may comprise a workstation, laptop computer, disconnectable mobile computer, server, mainframe, cluster, so-called "network computer" or "thin client," tablet, smartphone, personal digital assistant or other hand-held computing device, "smart" consumer electronics device or appliance, or a combination thereof. A server may include a physical server, a server cluster, a distributed server, a virtual server, a cloud server, a computer providing resources to one or more clients, a combination of one or more of the aforementioned, and/or the like. Some or all of the functions, steps, and/or operations discussed herein may be performed by one or more clients and/or one or more servers. Those of skill in the art will realize possible divisions of operations between the one or more servers and the one or more clients.

Each computer system includes at least a processor and a memory; computer systems may also include various input devices and/or output devices. The processor may include one or more general-purpose central processing units (CPUs), graphic processing units (GPUs), or Digital Signal Processors (DSPs), such as Intel®, AMD®, ARM®, Nvidia®, ATI®, TIC), or other "off-the-shelf" microprocessors. The processor may include a special-purpose processing device, such as an ASIC, PAL, PLA, PLD, Field Programmable Gate Array (FPGA), or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light or other pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computers may be capable of using a floppy drive, tape drive, optical drive, magneto-optical drive, memory card reader, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Embodiments may also be provided as a computer program product, including a non-transitory machine-readable storage medium having stored thereon instructions that may be used to program a computer system (or other electronic device) to perform processes described herein. The non-transitory machine-readable storage medium may include, but is not limited to, hard drives, floppy diskettes, optical disks, CD-ROMs, DVD-ROMs, ROMs, RAMs, EPROMs, EEPROMs, magnetic or optical cards, tapes, solid-state memory devices, or other types of media/machine-readable media suitable for storing electronic instructions.

Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer may function both as a client and as a server. Each network includes at least two computer systems, such as the server and/or clients.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Suitable software to assist in implementing the invention is readily provided by those of skill in the pertinent art(s) using the teachings presented here and programming languages and tools, such as Java, Pascal, C++, C, PHP, JavaScript, Python, C#, Perl, SQL, Ruby, Shell, Visual Basic, Assembly, Action Script, Objective C, Lisp, Scala, Tcl Haskell, Scheme, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, a script, an object, a component, a data structure, etc., that perform one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that may be used according to the present invention is already available, such as general-purpose computers, computer programming tools and techniques, computer networks and networking technologies, and digital storage media.

Figure 1:
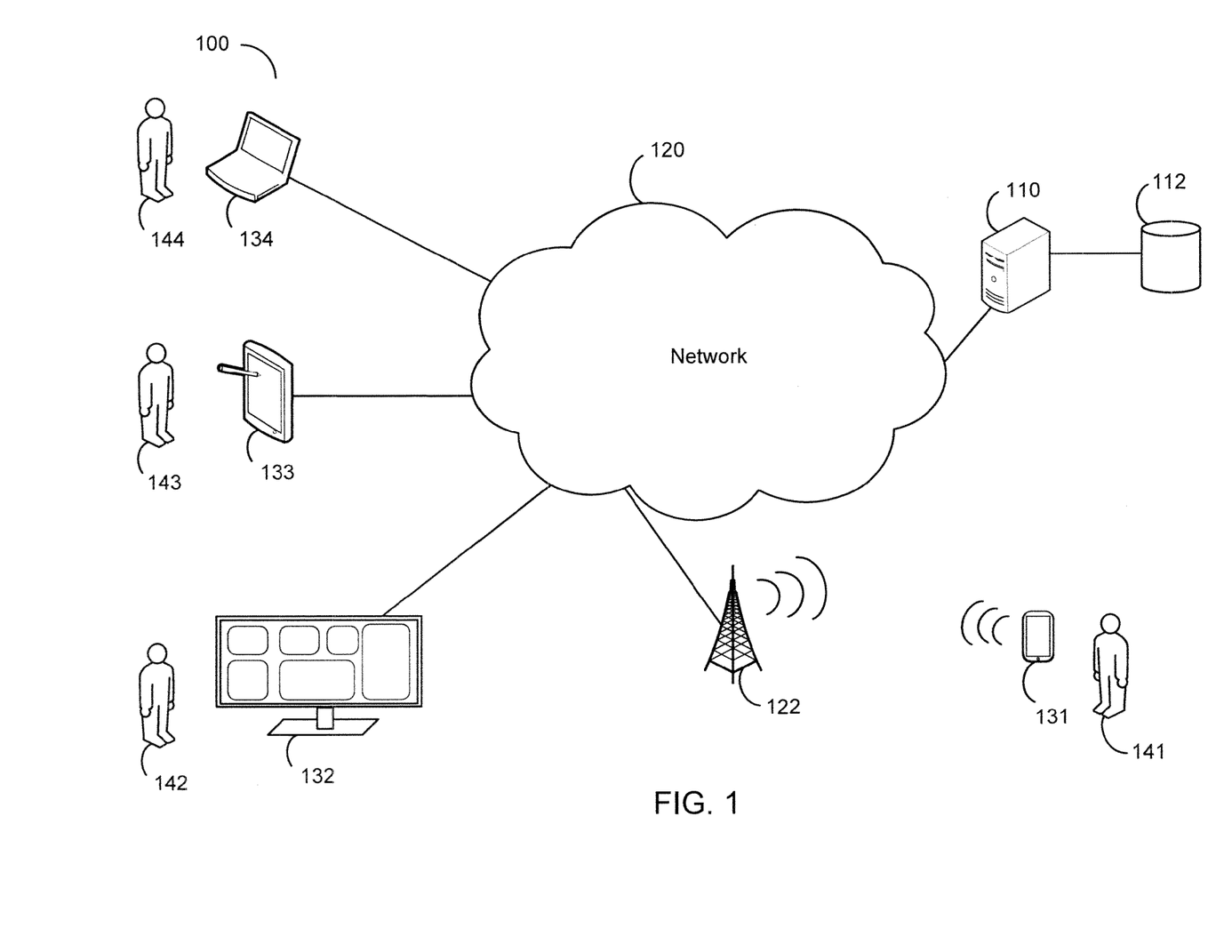
FIG. 1 is a schematic diagram of a system for notifying users of temporally and spatially proximate personally attended services.

FIG. 1 is a schematic diagram of a system 100 for notifying users 141, 142, 143, 144 of temporally and spatially proximate personally attended services. Each user 141, 142, 143, 144 may be operating a personal computer system 131, 132, 133, 134. The personal computer systems 131, 132, 133, 134 may include a smart phone 131, a smart television 132, a tablet computer 133, and a laptop 134. The personal computer system 131, 132, 133, 134 may be connected to a network 120, such as the Internet. For example, the smart phone 131 may be connected to a wireless network 122 coupled with the network 120.

The personal computer systems 131, 132, 133, 134 may be coupled to a data server 110. The data server 110 may store information about a plurality of personally attended services in a storage device 112. The storage device 112 may also, or instead, store a plurality of user profiles for the users 141, 142, 143, 144. When one of the personal computer systems 131, 132, 133, 134 determines that the corresponding user 141, 142, 143, 144 is available, it may transmit a user location, a user schedule, and/or the temporal-spatial criteria to the data server 110. The data server 110 may access the storage device 112 to identify personally attended services that satisfy the temporal-spatial criteria. In some embodiments, the temporal-spatial criteria and/or user schedule may be stored on the storage device 112, and/or the data server 110 may determine the user location based on information from the personal computer systems 131, 132, 133, 134, such as an IP address. Alternatively, or in addition, the personal computer systems 131, 132, 133, 134 may store information about the plurality of personally attended services, and/or retrieve information about personally attended services directly from one or more service computer systems (not shown) associated with the personally attended services. Some embodiments may not have the data server 110 and/or storage device 112. The personal computer systems 131, 132, 133, 134 may be configured to make reservations for the users 141, 142, 143, 144 through the data server 110 and/or directly with the service computer systems.

Figure 2:
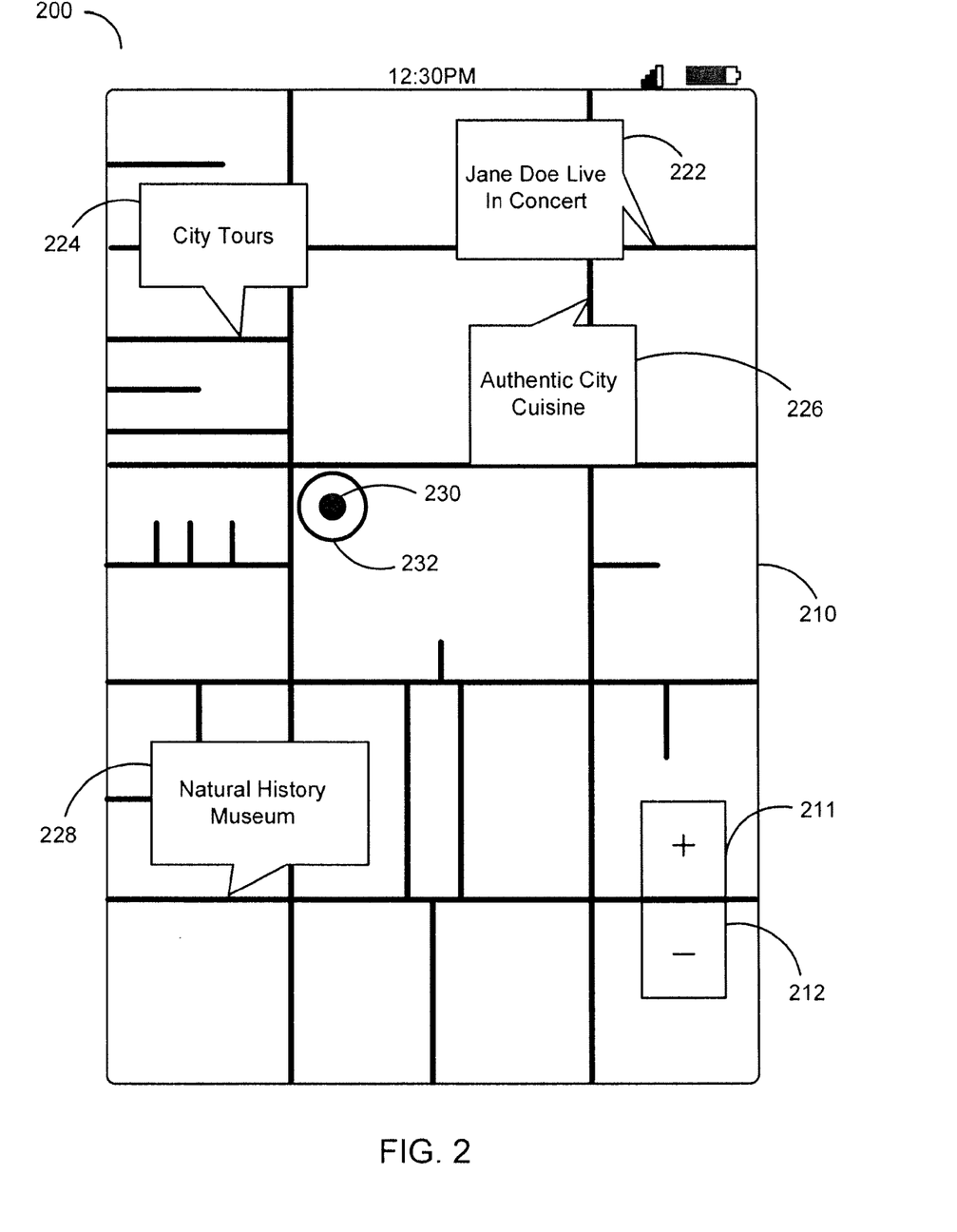
FIG. 2 is an exemplary screen display that may be presented to one of the users by the corresponding personal computer system.

FIG. 2 is an exemplary screen display 200 that may be presented to one of the users 141, 142, 143, 144 by the corresponding personal computer system 131, 132, 133, 134. The exemplary screen display 200 may include a map 210, which may include one or more controls 211, 212 to adjust the position and/or zoom of the map. The map 210 may include an indication of a user location 230 and/or an indication of location accuracy 232 for the user location 232. The map 210 may also include indications of a plurality of personally attended services 222, 224, 226, 228 near the user location 230 and/or satisfying preferences in a user profile and/or temporal-spatial criteria. The indications of the plurality of personally attended services 222, 224, 226, 228 may allow basic information about the personally attended services to be determined, such as the name and/or location.

Figure 3:
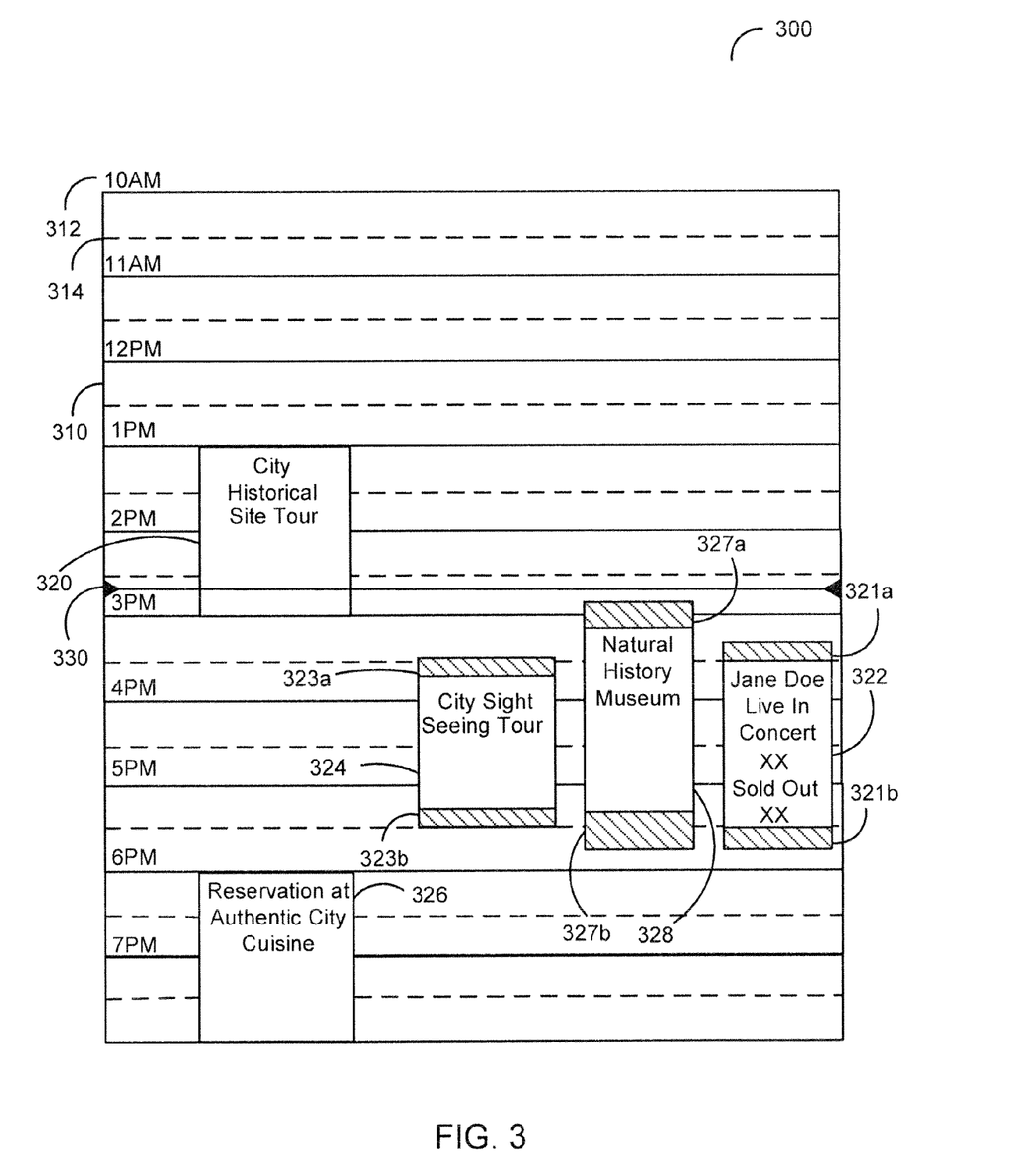
FIG. 3 is a pictorial representation of a method for determining whether a plurality of possible personally attended services satisfy temporal-spatial criteria.

FIG. 3 is a pictorial representation 300 of a method for determining whether each of a plurality of possible personally attended services 322, 324, 328 satisfies temporal-spatial criteria. The pictorial representation 300 includes a schedule 310 with a plurality of hour demarcations 312 and a plurality of half-hour demarcations 314 and a current time indication 330, which indicates a time of 2:40 PM. The user may be attending a current event 320 that is about to end. The user may also have an already scheduled event 326 that is scheduled to begin at 6:00 PM.

The computer system may determine that the user is available to receive indications of personally attended services that can be attended before the already scheduled event 326. The computer system may initially determine the possible personally attended services 322, 324, 328 satisfy spatial criteria. The computer system may determine whether the possible personally attended services 322, 324, 328 satisfy temporal criteria. The computer system may add a travel time 321a, 323a, 327a to the possible personally attended services 322, 324, 328 and/or a travel time 321b, 323b, 327b from the possible personally attended services 322, 324, 328. The computer system may determine whether the possible personally attended services 322, 324, 328 including travel time 321a,b, 323a,b, 327a,b conflict with the current event 320 and/or the already scheduled event 326. For example, a tour at the Natural History Museum 328 may not conflict with the current event 320, but the travel time 327a to the tour at the Natural History Museum 328 may be too long. Thus, the tour at the Natural History Museum 328 may not satisfy the temporal proximity.

The computer system may determine whether the possible personally attended services 322, 324, 328 have availability. For example, Jane Doe Live in Concert 322 may be sold out for this particular time. Therefore, Jane Doe Live in Concert may not satisfy the temporal-spatial criteria. Because only the City Sight Seeing Tour 324 may satisfy the temporal-spatial criteria, it may be presented to the user. The user may be offered the option to reserve a spot on the City Sight Seeing Tour 324 and/or to receive directions to and/or transportation information for the City Sight Seeing Tour 324.

Figure 4:
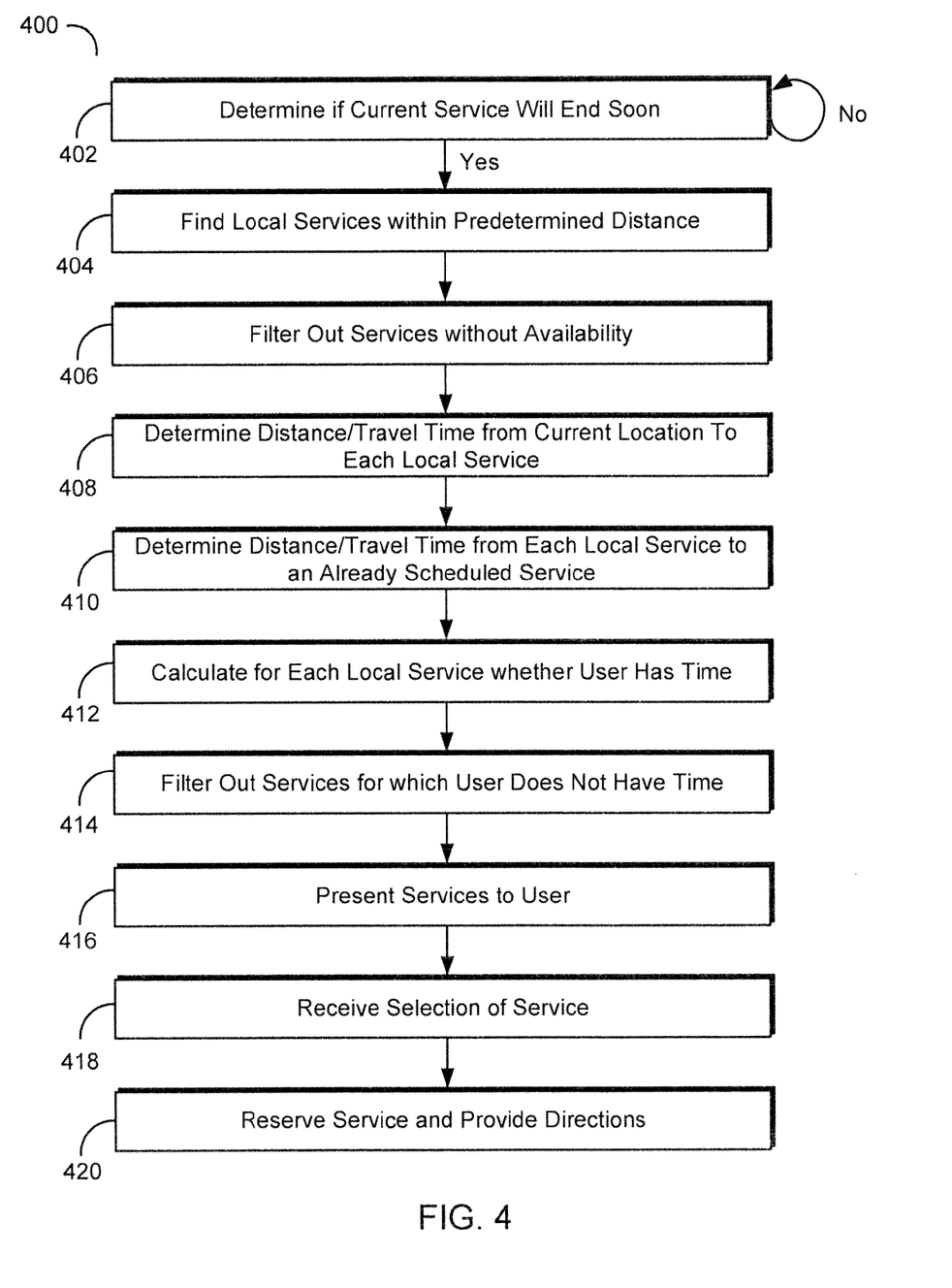
FIG. 4 is a flow diagram of a method for notifying a user of personally attended services satisfying temporal-spatial criteria.

FIG. 4 is a flow diagram of a method 400 for notifying a user of personally attended services satisfying temporal-spatial criteria. The method 400 may begin by determining 402 if a current service will end soon. A computer system may be in an idle state where it continuously and/or at regular intervals checks to see if the user is available to receive personally attended services. In the illustrated embodiment, the user may be deemed to be available if the current service will end within a predetermined time period. If it is determined that the current service will not end soon, the computer system may repeat step 402. Otherwise, the computer system may proceed to step 404.

If the user is available to receive a personally attended service, the computer system may find 404 local personally attended services within a predetermined distance of a user location. The computer system may determine the user location and submit the user location and the predetermined distance to a server comprising a database of personally attended services. The server may return a data structure, such as a list, of the local services within a predetermined distance. Alternatively, the server may determine the user location and/or may store the predetermined distance, and/or the computer system may comprise a database of personally attended services. The computer system and/or server may use a service location for each personally attended service to determine if the personally attended service is within a predetermined distance. In some embodiments, the local personally attended services may also be selected to be less than a predetermined time in the future. The computer system and/or the server may filter 406 out personally attended services that do not have availability (e.g., personally attended services that are sold out and/or have no additional capacity). The computer system and/or the server may retrieve availability from a third party, such as one or more service computer systems associated with personally attended services, and/or the computer system and/or the server may track availability. The personally attended services without availability may be removed and/or deleted from the list of local personally attended services to be presented to the user.

The computer system may determine 408 the distance and/or travel time from the user location to each local personally attended service on the list and may determine 410 the distance and/or travel time from each local personally attended service to an already scheduled service. The computer system may calculate 412 for each local personally attended service whether the user has time to attend the personally attended service. The computer system may calculate for each personally attended service whether the user can travel to the personally attended service before its start time. The computer system may also or instead calculate whether the user can travel to the already scheduled service before its start time once the personally attended service ends. The computer system may filter 414 out services for which the user does not have time (e.g., personally attended services at which the user will not be able to arrive before the start time and/or personally attended services that will prevent the user from arriving at the already scheduled service by the start time). The computer system may remove and/or delete services for which the user does not have time from the list of local personally attended services to be presented to the user.

The computer system may present 416 personally attended services satisfying temporal-spatial criteria to the user. The computer system may present local personally attended services on the list after personally attended services without availability and/or for which the user does not have time have been removed from the list. Various formats may be used to present the personally attended services to the user including on a map, on a calendar, as a list, and/or the like. The user may be able select one or more personally attended services to find out more information and/or to reserve the personally attended service. The computer system may receive 418 a user selection indicating that a personally attended service should be reserved. In response, the computer system may reserve 420 the service by submitting a request to the server and/or a third party, and/or the computer system may provide directions to the personally attended service to the user. In some embodiment, the computer system may receive an acknowledgement and/or confirmation, which may be displayed and/or indicated to the user. The directions provided by the computer system may include a map and/or instructions on the method of transportation to use.

Figure 5:
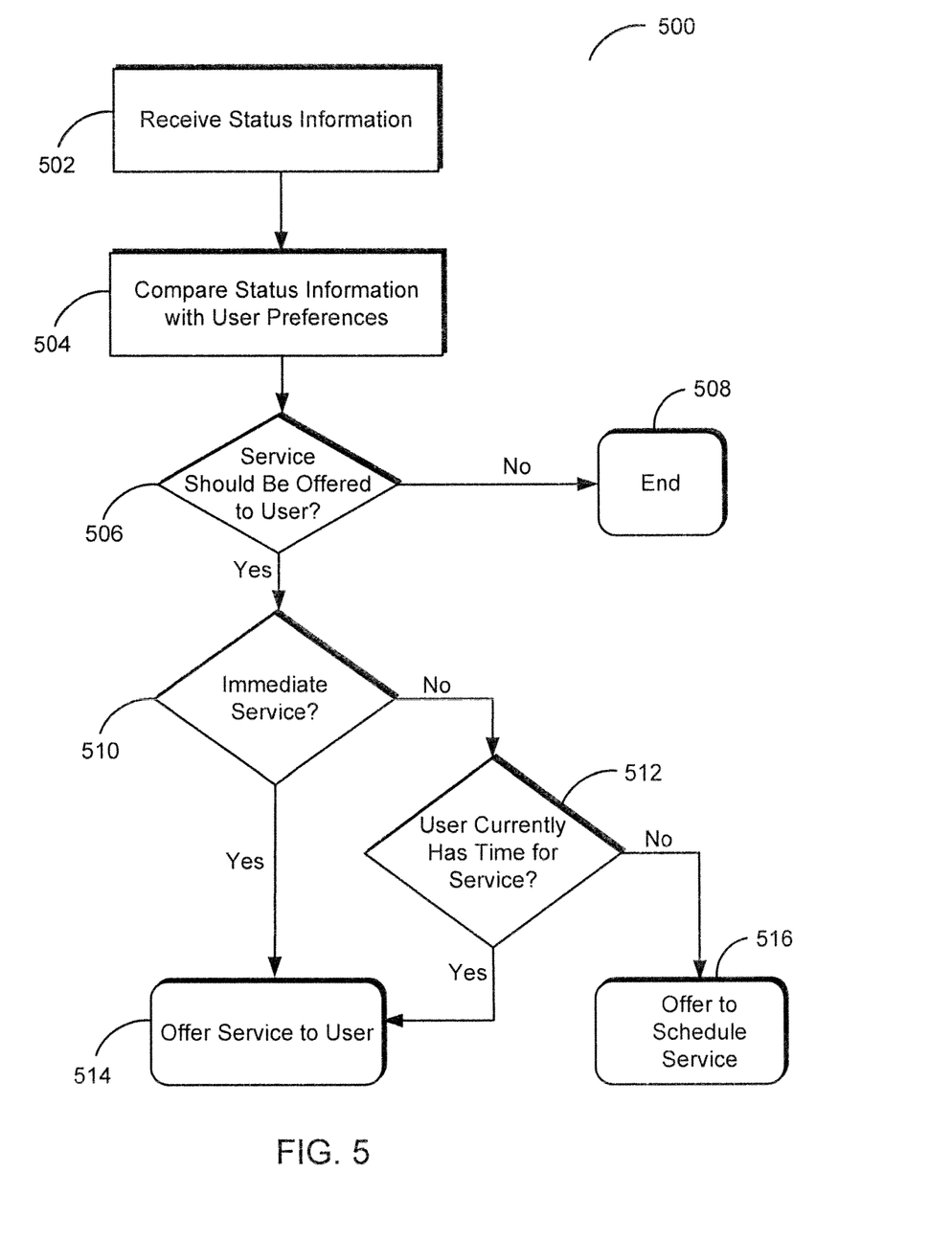
FIG. 5 is a flow diagram of a method for determining user availability to receive a personally attended service from third party information.

FIG. 5 is a flow diagram of a method 500 for determining user availability to receive a condition-related personally attended service based on third party information. A computer system may receive 502 status information from a server and/or a third party, and/or the computer system may receive the status information from a program or application, such as a calendar application. The computer system may have requested the status information (e.g., by making periodic requests) and/or may receive the status information without first submitting a request (e.g., the status information may be pushed to the computer system). The status information may be compared 504 with user preferences. The user preferences may indicate one or more situations when a service should be offered to the user. For example, the user may have indicated that the user is interested in certain services when a discount is available, that the user is interested in having a taxi requested during inclement weather, and/or the like.

From the status information and user preferences, the computer system may determine 506 if a condition exists whereby one or more condition-related personally attended service should be offered to the user. If a condition-related personally attended service should not be offered to the user, the method 500 may end 508. Otherwise, the method 500 may continue to step 510. At step 510, the computer system may determine 510 whether one of the condition-related personally attended services is an immediate service. An immediate service may be a personally attended service that is likely to be used by the user immediately or not at all and/or that is unlikely to conflict with other personally attended services. For example, transport services, such as a taxi service, may be immediate services. If the condition-related personally attended service is an immediate service, the computer system may offer 514 the service to the user. Otherwise, the method 500 may continue to step 512.

For non-immediate services, the computer system may determine 512 whether the user currently has time for any of the condition-related personally attended services. If the user does have time, the computer system may offer 514 the condition-related personally attended services for which the user does have time to the user. The user may be able to reserve an offered personally attended service, get directions to an offered personally attended service, schedule an offered personally attended service for a later time, decline an offered personally attended service, and/or the like. If there are any condition-related personally attended services for which the user does not currently have time, the computer system may offer 516 to schedule those condition-related personally attended services for a later time. The condition-related personally attended services may be scheduled internally, a reservation may be made, the condition-related personally attended services may be declined, and/or the like.

It will be understood by those having skill in the art that many changes may be made to the details of the above-described embodiments without departing from the underlying principles of the disclosure. The scope of the present disclosure should, therefore, be determined only by the following claims.

The invention claimed is:

1. A method of notifying a user about temporally and spatially proximate personally attended services using a computer system, the method comprising:
   the computer system detecting user availability for receiving a personally attended service;
   the computer system determining a user location;
   the computer system determining methods of transportation proximate to the user location;
   for each method of transportation, the computer system selecting a transportation buffer time;
   the computer system determining temporal-spatial criteria from a configuration based at least in part on user information, the temporal-spatial criteria including a weighting of the user location, travel time and a user profile;
   the computer system identifying one or more personally attended services satisfying the temporal-spatial criteria, the identifying comprising:
      determining available personally attended services within a geographic area;
      computing a travel time to each of the available personally attended services, including the transportation buffer time;
      for each of the available personally attended services, adding a buffer time for pre-service requirements;
   the computer system retrieving available third-party rankings of the one or more personally attended services;
   the computer system ranking the one or more personally attended services based at least in part on the user profile and available third-party rankings;
   the computer system presenting the one or more personally attended services to the user; and
   the computer system dynamically updating, based at least in part on the temporal-spatial criteria, the one or more personally attended services to the user.

2. The method of claim 1, wherein identifying one or more personally attended services satisfying temporal-spatial criteria comprises determining for each personally attended service whether a conflict is created with an already scheduled event.

3. The method of claim 2, wherein determining for each personally attended service whether a conflict is created comprises:
   determining a respective end time for each personally attended service and a start time for the already scheduled event;
   computing a travel time from an end location of each personally attended service to a start location of the already scheduled event; and
   comparing the respective end time and the travel time for each personally attended service with the start time for the already scheduled event.

4. The method of claim 1, wherein identifying one or more personally attended services satisfying temporal-spatial criteria comprises identifying one or more personally attended services within a predetermined distance of the user location.

5. The method of claim 1, wherein identifying one or more personally attended services satisfying temporal-spatial criteria comprises determining availability of the one or more personally attended services.

6. The method of claim 1, further comprising reserving an identified personally attended service in response to a user indication.

7. The method of claim 1, wherein identifying one or more personally attended services satisfying temporal-spatial criteria comprises identifying the one or more personally attended services according to a user profile.

8. The method of claim 7, further comprising generating the user profile at least in part from information gathered from a third party.

9. The method of claim 8, wherein the third party comprises an online social network.

10. The method of claim 7, further comprising generating the user profile at least in part from past user behavior.

11. The method of claim 1, wherein detecting user availability for receiving a personally attended service comprises:
    gathering information from a third party; and
    identifying a condition receptive to a condition-related personally attended service.

12. The method of claim 1, wherein the one or more personally attended services comprise a personally attended service selected from the group consisting of a show, a restaurant, a taxi, and a spa treatment.

13. A non-transitory computer-readable storage medium comprising program code configured to cause a computer system to perform a method for notifying a user of temporally and spatially proximate personally attended services, the method comprising:
    detecting user availability for receiving a personally attended service;
    determining a user location;
    determining methods of transportation proximate to the user location;
    for each method of transportation, selecting a transportation buffer time;
    determining temporal-spatial criteria from a configuration based at least in part on user information, the temporal-spatial criteria including a weighting of the user location, travel time and a user profile;
    identifying one or more personally attended services satisfying the temporal-spatial criteria, the identifying comprising:
       determining available personally attended services within a geographic area;
       computing a travel time to each of the available personally attended services, including the transportation buffer time;
       for each of the available personally attended services, adding a buffer time for pre-service requirements;

retrieving available third-party rankings of the one or more personally attended services;

ranking the one or more personally attended services based at least in part on the user profile and available third-party rankings;

presenting the one or more personally attended services to the user; and dynamically updating, based at least in part on the temporal-spatial criteria, the one or more personally attended services to the user.

14. The non-transitory computer-readable storage medium of claim 13, wherein identifying one or more personally attended services comprises determining for each personally attended service whether a conflict is created with an already scheduled event, and wherein presenting the one or more personally attended services to the user further comprises displaying a personally attended service having a conflict based at least in part on a weighting using user profile information.

15. The non-transitory computer-readable storage medium of claim 14, wherein determining for each personally attended service whether a conflict is created comprises:

determining a respective end time for each personally attended service and a start time for the already scheduled event;

computing a travel time from an end location of each personally attended service to a start location of the already scheduled event; and comparing the respective end time and the travel time for each personally attended service with the start time for the already scheduled event.

16. The non-transitory computer-readable storage medium of claim 13, wherein identifying one or more personally attended services comprises identifying one or more personally attended services within a predetermined distance of the user location.

17. The non-transitory computer-readable storage medium of claim 13, wherein identifying one or more personally attended services comprises determining availability of the one or more personally attended services.

18. The non-transitory computer-readable storage medium of claim 13, wherein the method further comprises reserving an identified personally attended service in response to a user indication.

19. The non-transitory computer-readable storage medium of claim 13, wherein identifying one or more personally attended services comprises identifying the one or more personally attended services according to a user profile.

20. The non-transitory computer-readable storage medium of claim 19, wherein the method further comprises generating the user profile at least in part from information gathered from a third party.

21. The non-transitory computer-readable storage medium of claim 20, wherein the third party comprises an online social network.

22. The non-transitory computer-readable storage medium of claim 19, wherein the method further comprises generating the user profile at least in part from past user behavior.

23. The non-transitory computer-readable storage medium of claims 13, wherein detecting user availability for receiving a personally attended service comprises:

gathering information from a third party; and identifying a condition receptive to a condition-related personally attended service.

24. A computer system configured to notify a user about temporally and spatially proximate personally attended services, the computer system comprising:

a processor; and a memory comprising:

a location module configured to determine a user location;

a services module configured to:

detect user availability for receiving a personally attended service, and determining methods of transportation proximate to the user location;

for each method of transportation, selecting a transportation buffer time;

determining temporal-spatial criteria from a configuration based at least in part on user information, the temporal-spatial criteria including a weighting of the user location, travel time and a user profile;

identify one or more personally attended services satisfying the temporal-spatial criteria, the identifying comprising:

determining available personally attended services within a geographic area;

computing a travel time to each of the available personally attended services, including the transportation buffer time;

for each of the available personally attended services, adding a buffer time for pre-service requirements;

retrieving available third-party rankings of the one or more personally attended services;

ranking the one or more personally attended services based at least in part on the user profile and available third-party rankings; and dynamically updating, based at least in part on the temporal-spatial criteria, the one or more personally attended services;

an output module configured to present the one or more personally attended services to the user with an output device.

* * * * *